United States Patent Office — 3,114,776 — Patented Dec. 17, 1963

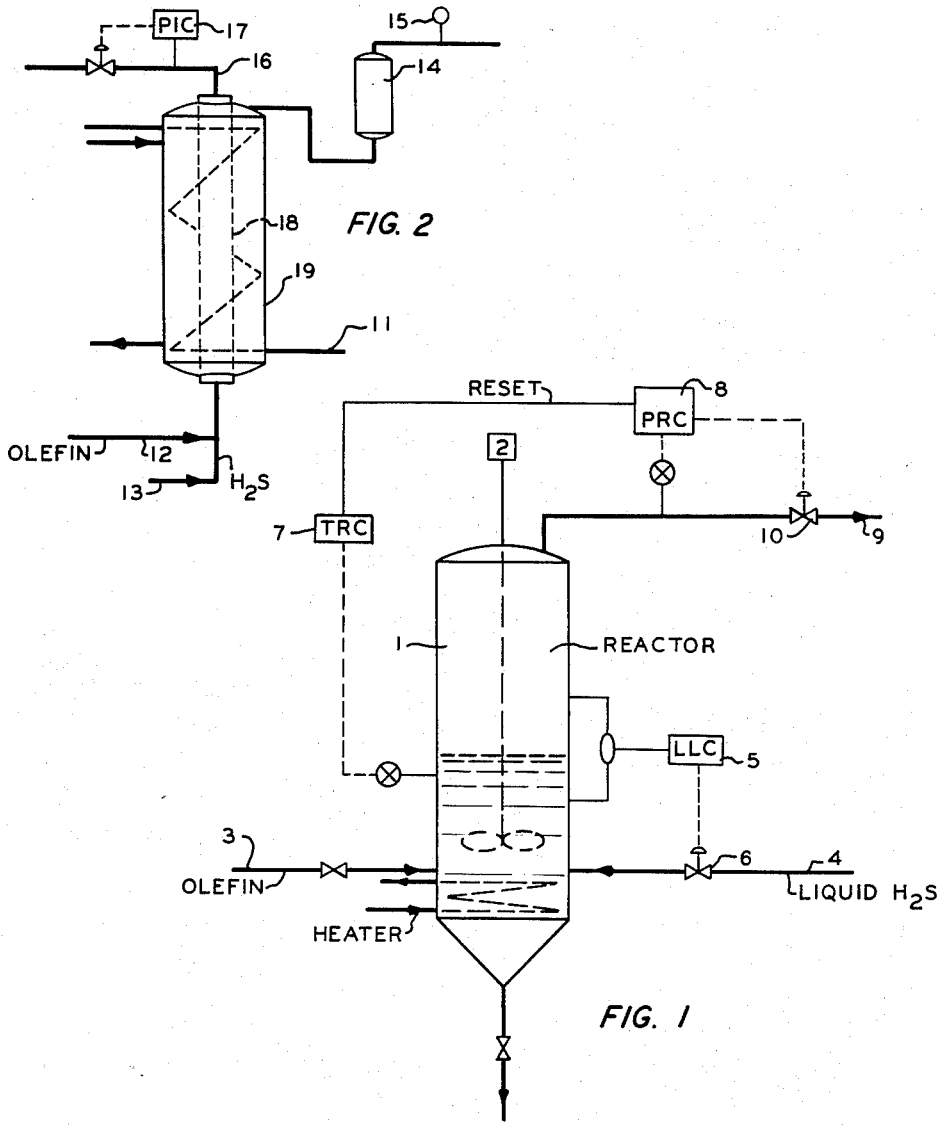

3,114,776
REACTION OF HYDROGEN SULFIDE WITH OLEFINS

Paul F. Warner, Phillips, Tex., assignor to Phillips Petroleum Company, a corporation of Delaware
Filed Nov. 9, 1961, Ser. No. 151,272
10 Claims. (Cl. 260—609)

This invention relates to an improved synthesis for the preparation of olefinic mercaptans and particularly mercaptans of bicyclic terpenes such as the bicyclic pinyl mercaptans.

One aspect of this invention relates to providing a reaction having a controlled temperature for preparing mercaptans of olefins and particularly mercaptans of bicyclic terpenes. Another aspect of this invention relates to controlling of reaction temperature in the formation of mercaptans by the use of an excess of one of the reactants. Another aspect of this invention relates to the use of excess hydrogen sulfide to control reaction rate and temperature in the formation of mercaptans of bicyclic terpenes. Still another aspect of this invention relates to controlling reaction temperature in the formation of mercaptans of olefinic compounds by removal of latent heat from the reaction zone.

Mercaptans of olefinic compounds such as mercaptans of bicyclo terpenes are particularly useful as chemical intermediates. For example, it is known that bicyclo mercaptans can be converted into thio-ethers and disulfides as shown by Ber. 39, 2352 and Gazz Chim. Ital. 39 (ii) 208 (1909). These thio-ethers and disulfides are exceptionally effective cutting oil additives when dissolved in mineral lubricating oils at concentrations of about 1 to 10 percent by weight. Excellent lubricating oil antioxidants are prepared by reacting 4 moles of these bicyclo mercaptans with 1 mole of $P_2S_5$ at temperatures of 100° C. to 120° C. followed by subsequent neutralization of the acidic reaction product with a basic inorganic compound, such as zinc oxide, barium sulfide, or the like. The resultant metallic salts when dissolved in crankcase lubricating oil at concentrations of 0.1 to .5 percent by weight impart to the base oil greatly improved oxidation resistance and reduced bearing corrosion tendencies. In addition, pinyl mercaptan is unique in that its odor is more like that of camphor than the odor typical of mercaptans. Because of its unique properties, the compound may be utilized where mercaptan sulfur is desired, but the odor typical of mercaptans is objectionable. Generally, in the reaction of olefinic compounds and particularly with terpenes, the temperature should be maintained below 200° F. so as to prevent undesirable products. However, in the past the preparation of mercaptans, and particularly mercaptans of bicyclic terpenes, has left much to be desired due to the extreme exothermic nature of the reaction. For example, in conventional preparation of pinyl mercaptan by the reaction of hydrogen sulfide with α-pinene, the hot spot temperature could not be kept below about 300° F. even by circulating cold water through the jacket of the reactor and the hot spot was at the top of the case at the point of contact of the reactants with the catalyst. In addition, the high temperature produced undesirable products thereby decreasing the yield of the desired mercaptan.

In contrast thereto, I have now discovered a novel method for the synthesis of mercaptans and particularly the mercaptans of bicyclo terpenes wherein conventional mercaptan equipment can be utilized but reaction temperature is controlled so that the reaction can be carried out at the deired operating temperatures.

In accordance with this invention mercaptans of olefinic compounds are prepared by reacting an olefinic compound such as a bicyclic terpene with excess $H_2S$ in the liquid phase at the desired operating temperature. The excess $H_2S$ vaporizes at the desired operating temperature, is then condensed and returned to the reaction zone where it serves as a temperature control. Thus $H_2S$ is vaporizing and refluxing continually in the reaction.

It is an object of the present invention to provide an improved process for the preparation of mercaptans of olefinic compounds such as bicyclic terpenes. Another object of this invention is to provide process for mercaptans of olefinic compounds which gives an improved yield of the desired product and reduced production of undesirable by-products.

Other aspects, objects, and the several advantages of this invention are apparent from this disclosure, the appended claims and the drawing, which is a diagrammatic view of the process of this invention.

FIGURE 1 represents a suitable reactor for carrying out this invention. FIGURE 2 represents an alternative system for preparing the mercaptans in accordance with this invention.

According to FIGURE 1 there is provided a reactor which is, in turn, provided with means for agitating the contents of same such as the agitating means 2, consisting of motor and stirrer and which are so adapted so that an olefinic compound can be introduced through inlet 3 and liquid hydrogen sulfide introduced through conduit 4. The reactor 1 is provided with liquid level control 5 which, in turn, serves to operate valve 6 responsive thereto so as to maintain the desired level in the reaction zone. The reactor 1 is in addition provided with a temperature controller 7, and a pressure controller 8. The pressure recorder controller 8 senses the pressure in the reactor and maintains the pressure constant by varying the opening of the valve 10 in the line. This valve 10 regulates the rate of flow of effluent from the reactor through conduit 9 so as to maintain a constant predetermined reactor pressure. The temperature of the reaction is controlled by a temperature recorder controller 7 which senses the temperature in the reactor and resets the pressure recorder controller 8 so that, for example, if the temperature increases in the reactor, the pressure recorder controller opens the valve to reduce the reactor pressure and causes the hydrogen sulfide to evaporate which, in turn, cools the reaction. If the temperature decreases in the reactor, the pressure recorder controller closes the valve to increase the reactor pressure and lower the evaporation of hydrogen sulfide. As the reaction takes place, there will be a change in concentration of the reactants in the reactor. This will result in change in the temperature-pressure relationship which will be corrected by the temperature controller 7 resetting the pressure controller 8.

As shown in FIGURE 2, there is provided a tubular reactor 18 which is provided with jacket 19 and heating coil 11, if desired, which aids in heating the catalyst bed to a temperature sufficient to promote the reaction. Olefinic compound can be introduced through inlet 12 and liquid $H_2S$ through inlet 13. The jacket on the reactor is additionally provided with a reflux condenser 14 and a pressure controller 15 which serves to allow some variation in the temperature maintained in jacket 19. Conduit 16 is provided to remove the mercaptan from the reactor and is provided with pressure controller which maintains the pressure on the reactor.

Thus, according to this invention there is provided in the reaction of an olefinic compound and hydrogen sulfide over a mercaptan promoting catalyst a method for controlling the reaction temperature by using excess hydrogen sulfide and sufficient pressure to maintain the hydrogen sulfide in the liquid phase at the desired operating temperature. Thus, this invention provides a method for controlling the reaction temperature in an exothermic reaction wherein an excess of one of the reactants is utilized. The reactants are maintained at the boiling point of the solution. As the temperature rises, the pressure in the reactor rises accordingly. This actuates the pressure controlled valve and sufficient $H_2S$ is vaporized to bring the pressure, and consequently the temperature, back to the desired levels.

The following examples will serve to further illustrate the invention.

EXAMPLE I

The synthesis run was made using 18-inch long by 1-inch I.D. jacketed stainless steel catalyst case equipped with a thermowell and a water jacket.

Fresh Filtrol grade 71 catalyst was used for the run. The catalyst was activated (dried) at 350 to 400° F. in an oven for at least 4 hours prior to use.

Plant grade hydrogen sulfide of 55 to 88 mole percent purity was used as reactant and diluent for the run. The crude hydrogen sulfide to pinene mole ratio for the entire run was about 14 to 1.

The pinene was pumped to the catalyst case with a Milton Roy "MiniPump" at the average flow rate of 0.9 volume of pinene per volume of catalyst per hour.

Conditions for the run were 440 to 570 p.s.i.g. and 170° F. to 200° F. The reaction appeared to go well over the wide pressure range. The higher extremity, 500 to 570 p.s.i.g. appeared to favor the reaction slightly. The reaction temperature should not exceed about 200° F. for best results. At higher temperatures the product becomes predominantly heavy material which at this time is unknown but is believed to be a mixture of high boiling mercaptain and sulfides.

The effluent was distilled in a 5-foot long by 1-inch I.D. Vigreux column and in a 4-foot long by 1-inch I.D. spinning band column. All cuts having a mercaptan sulfur content in excess of 14.1 weight percent (75 percent mercaptan) were composited to give the finished product having a purity of 93.6 weight per cent.

Table I presents the experimental and material balance data for the run.

Table II shows properties of the mercaptan product.

Table I

EXPERIMENTAL AND MATERIAL BALANCE DATA FROM SYNTHESIS OF PINYL MERCAPTAN FROM ALPHA PINENE

Charge:
- Alpha pinene, lbs. _____ 71.9
- $H_2S$, lbs. _____ 240.0
- $H_2S$/alpha pinene mole ratio _____ 14.3

Conditions:
- Pressure, p.s.i.g. _____ 440 to 570
- Flow rate, ave. v./v./hr. _____ 0.9
- Catalyst _____ Filtrol grade 71
- Catalyst temperature: internal hot spot, F__ 170 to 200

Balance (actual recovery basis):
- Alpha pinene charge, lbs. _____ 71.9
  - Moles _____ 0.52
  - Mole percent _____ 100.0
- Products, mole percent—
  - Recycle pinene _____ 23.1
  - Pinyl mercaptan _____ 48.2
  - Heavy product _____ 19.2
  - Unaccountable loss _____ 9.5

Yield per pass:
- Pounds pinyl mercaptan recovered per pound alpha pinene charged _____ 0.51
- Pounds pinyl mercaptan produced per pound alpha pinene charged _____ 0.59

Ultimate yield:
- Pounds pinyl mercaptan produced per pound of olefin consumed _____ 0.76

Table II

PROPERTIES OF PINYL MERCAPTAN

- Refractive index, 20/D _____ 1.5074
- Specific gravity, 20/4 _____ 0.9658
- Mercaptan sulfur, wt. percent _____ 17.66
- Total sulfur, wt. percent _____ 18.23
- Molecular weight _____ 166.5
- Mercaptan purity, wt. percent _____ 93.6
- Distillation, 5 mm. cor. to 760 mm., ° F.:
  - Percent condensed—
    - IBP _____ 406
    - 5 _____ 416
    - 10 _____ 419
    - 20 _____ 422
    - 30 _____ 425
    - 40 _____ 427
    - 50 _____ 428
    - 60 _____ 429
    - 70 _____ 430
    - 80 _____ 433
    - 90 _____ 440
    - 95 _____ 473

The properties of the pinyl mercaptan produced from alpha pinene indicate it is quite similar to that produced from turpentine. Spectro chromatographic analysis of the two mercaptans indicates the product is composed of two major components with at least four other minor components. Table III shows the spectro analysis of the mercaptan products produced from alpha pinene and turpentine.

EXAMPLE II

The process of Example I was carried out with turpentine being used in toto as the source of the bicyclo terpenes. The resulting pinyl mercaptans were recovered by fractional distillation of the reactor effluent.

In carrying out the process of this invention the reactants can be in the range of: 1.5 parts by weight hydrogen hulfide to 1 part by weight olefin up to 5 parts by weight $H_2S$ to 1 part by weight olefin or higher if desired.

The range of flow rate for the reactants is: 0.5 up to 5 volumes olefin per volume of catalyst per hour and preferably 1 to 2.

Table III

SPECTRO CHROMATOGRAPHIC ANALYSIS OF PINYL MERCAPTAN PRODUCED FROM ALPHA PINENE AND FROM TURPENTINE

| Sample Number | 1 | 2 |
|---|---|---|
| Feedstock | Alpha Pinene | Turpentine [1] |
| Spectro Analysis, weight percent: | | |
| Mercaptan Component [2] | 41.6 | 46.6 |
| Mercaptan Component [3] | 39.8 | 26.8 |
| Mercaptan Component | 14.1 | 20.7 |
| Unreacted Olefins | 3.0 | 5.9 |
| Heavy Product | 1.5 | -------- |
| Total | 100.0 | 100.0 |

[1] 65.7 weight percent alpha pinene, 31.8 weight percent beta pinene.
[2] Mercaptan product from alpha pinene.
[3] Mercaptan product from beta pinene.

The catalyst employed in this invention is of the type which promotes the addition of $H_2S$ to an olefin. Such catalyst may be silica-alumina, alumina, acidic type clay catalyst and the like. However, the preferred catalyst is a Filtrol catalyst grade 71 which is a montmorillonite having the following analysis:

Weight percent
- $SiO_2$ _____ 70.9
- $Al_2O_3$ _____ 17.0
- $Fe_2O_3$ _____ 3.9
- $MgO$ _____ 3.2
- $CaO$ _____ 1.6
- $SO_3$ _____ 1.8
- $K_2O + Na_2O$ _____ 1.0
- $TiO_2$ _____ 0.6

In carrying out the process of this invention, the reactants are maintained at the boiling point of the solution. As the temperature rises, the pressure in the reactor rises accordingly. This actuates the pressure controlled valve and sufficient $H_2S$ is vaporized to bring the pressure, and consequently the temperature, back to the desired levels.

The hydrogen sulfide may be pre-mixed with the olefin or fed separately (as shown in the figure) and passed over the catalyst in the reactor at the required pressure. A heater can be utilized to start the reaction. As the reaction takes place, there will be a change in concentration of the reactants in the reactor. This will result in a change in the temperature-pressure relationship which can be corrected by the temperature controller resetting the pressure controller.

In addition to the Filtrol grade 71 catalyst utilized in this invention, other catalysts can be used. For example, silica-alumina or bauxite can be used for the mercaptan manufacture.

In addition to the bicyclo compound such as terpene as herein disclosed, other olefins having 2–12 carbon atoms can be used as reactants. This invention is especially applicable for light olefins such as ethylene, propylene, isobutylene where otherwise a diluent would have to be used to control the reaction temperature. Bicyclic terpenes suitable for this invention can be obtained from wood, gum and the sulfate turpentines. The natural occurring terpenes are generally separated by fractional distillation to produce the material of commerce.

In the past inert diluents have been utilized for controlling reaction temperature. However, the use of $H_2S$ as a reaction diluent has two advantages over inert diluents such as hexane or rosin solvent. These are: (1) The excess $H_2S$ flashes from the product at the catalyst case outlet and does not have to be fractionated out later in the distillation, and (2) Conditions in the case can be set so that the heat of reaction vaporizes a part or all of the $H_2S$ and thus a constant temperature can be maintained in the case without difficulty. This is a distinct advantage since the reaction of $H_2S$ with $\alpha$-pinene is extremely exothermic.

A run was made under conditions similar to that of Example I except the pressure was maintained at 800 p.s.i.g. on the case. Without diluent and with a $H_2S$ to pinene mole ratio of 1.5, the hot spot temperature could not be kept below about 300° F. even by circulating cold water through the jacket of the reactor. The hot spot was at the top of the case at the point of contact of the reactants with the catalyst. In contrast thereto, in the runs of Examples I and II there was no hot spot and the temperature was nearly uniform throughout the case.

While this invention has been illustrated by using $\alpha$-pinene and the terpenes of turpentine, other bicyclo terpenes such as:

| | |
|---|---|
| $\beta$-pinene | $\beta$-fenchene |
| 3-carene | $\gamma$-fenchene |
| 4-carene | $\Delta$-fenchene |
| camphene | $\epsilon$-fenchene |
| bornylene | sabinene |
| isobornylene | $\alpha$-thujene |
| $\alpha$-fenchene | $\beta$-thujene | and the like may be used.

Generally, when using terpenes as a reactant, the temperature should be below 200° F. and preferably between 100° F. and 200° F. When other olefins are utilized, the reaction temperature can be between 200° F. and 325° F.

The pressure range for this invention must be set to give the desired temperature. In general, a pressure range of 400–800 p.s.i.g. will serve to achieve the desired reaction temperature.

The term olefinic mercaptan as used herein designates a mercaptan made from olefinic compounds.

Reasonable variation and modification are possible within the scope of the foregoing disclosure the essence of which is that there is provided an improved process for preparing mercaptans of olefinic compounds which comprises reacting an olefinic compound with an excess of hydrogen sulfide at a desired temperature while maintaining an elevated pressure such that excess hydrogen sulfide will be present as a liquid in the reaction mass and such that it will vaporize in the quantity sufficient to maintain the desired temperature.

I claim:

1. A process for the preparation of olefinic mercaptans which comprises reacting an olefin-containing compound with an excess of hydrogen sulfide at an elevated temperature within the range of between 100 and 325° F. while maintaining a constant elevated pressure within the range of 400 to 800 p.s.i.g. such that excess hydrogen sulfide will be present as a liquid in the reacting mass such that it will absorb the heat of reaction and thereby vaporize in a quantity sufficient to maintain said temperature.

2. A process for the preparation of mercaptans of bicyclo terpenes which comprises reacting a bicyclo terpene with an excess of hydrogen sulfide at an elevated temperature within the range of between 100° and 200° F. while maintaining a constant elevated pressure within the range of 400 to 800 p.s.i.g. such that the excess hydrogen sulfide will be present as a liquid in the reacting mass such that it will absorb the heat of reaction and thereby vaporize in a quantity sufficient to maintain said temperature.

3. A process for the preparation of a pinene mercaptan which comprises reacting a pinene selected from the group consisting of alpha pinene and beta pinene with an excess of hydrogen sulfide at an elevated temperature within the range of between 100° and 200° F. while maintaining a constant elevated pressure within the range of 400 to 800 p.s.i.g. such that the excess hydrogen sulfide will be present as a liquid in the reaction mass such that it will absorb the heat of reaction and thereby vaporize in a quantity sufficient to maintain said temperature.

4. The process of claim 1 wherein the olefin and the hydrogen sulfide are present in a mole ratio of about 1:10 to 1:12.

5. The process of claim 2 wherein the reaction is carried out at a pressure of about 550 p.s.i.g.

6. The process of claim 5 wherein the reaction is carried out at a temperature of about 175° F.

7. The process of claim 3 wherein the reaction is carried out with a montmorillonite clay catalyst.

8. A process for preparing olefinic mercaptans by the reaction of an olefin-containing compound with hydrogen sulfide which comprises carrying out the reaction over a catalyst for promoting the formation of olefinic mercaptans, said catalyst selected from the group consisting of alumina, silica-alumina, bauxite and a montmorillonite clay with excess hydrogen sulfide at a pressure selected from within the range of about 400 to 800 p.s.i.g. sufficient to maintain a portion of the hydrogen sulfide in the liquid phase at the desired operating temperature, selected from within the range of 100° to 325° F.

9. The process of claim 2 wherein the bicyclo terpene-containing compound is turpentine.

10. A process for preparing pinyl mercaptan which comprises reacting turpentine in the presence of a catalyst for promoting the formation of olefinic mercaptans, said catalyst selected from the group consisting of alumina, silica-alumina, bauxite and a montmorillonite clay with excess hydrogen sulfide at a temperature within the range of between 100° F. and 200° F. while maintaining an elevated pressure within the range of 400 to 800 p.s.i.g. such that the excess hydrogen sulfide present as a liquid in the reacting mass will absorb the heat of reaction and vaporize in a quantity sufficient to maintain the temperature constant.

References Cited in the file of this patent

UNITED STATES PATENTS

| | | |
|---|---|---|
| 2,076,875 | Borglin et al. | Apr. 13, 1937 |
| 2,443,852 | Eaton et al. | June 22, 1948 |
| 2,610,981 | Short | Sept. 16, 1952 |